(12) United States Patent
Di Liberto et al.

(10) Patent No.: US 12,203,571 B2
(45) Date of Patent: Jan. 21, 2025

(54) INTEGRATED JUNCTION SYSTEM FOR TUBULAR FLUID DISTRIBUTION ELEMENTS

(71) Applicant: Pipes & Fittings Eqofluids S.L., Raima de Gandia (IT)

(72) Inventors: Luca Di Liberto, Genoa (IT); Giacomo Granata, Gandia (IT); Miguel Cerda', Gandia (IT)

(73) Assignee: Pipes & Fittings Eqofluids S.L., Valencia (ES)

( * ) Notice: Subject to any disclaimer, the term of this patent is extended or adjusted under 35 U.S.C. 154(b) by 0 days.

(21) Appl. No.: 18/032,258

(22) PCT Filed: Oct. 29, 2021

(86) PCT No.: PCT/EP2021/025424
§ 371 (c)(1),
(2) Date: Apr. 17, 2023

(87) PCT Pub. No.: WO2022/096146
PCT Pub. Date: May 12, 2022

(65) Prior Publication Data
US 2023/0400127 A1 Dec. 14, 2023

(30) Foreign Application Priority Data
Nov. 4, 2020 (IT) .................. 102020000026242

(51) Int. Cl.
*F16L 21/03* (2006.01)
*F16L 21/035* (2006.01)

(52) U.S. Cl.
CPC ............. *F16L 21/03* (2013.01); *F16L 21/035* (2013.01)

(58) Field of Classification Search
CPC .......... F16L 47/08; F16L 21/035; F16L 21/05
See application file for complete search history.

(56) References Cited

U.S. PATENT DOCUMENTS

| 634,848 A | 10/1899 | Courson |
| 3,054,627 A | 9/1962 | Ligon |

(Continued)

FOREIGN PATENT DOCUMENTS

| DE | 1944832 A1 * | 3/1971 | |
| DE | 29706933 U1 * | 9/1997 | ............ F16L 21/035 |

(Continued)

*Primary Examiner* — Zachary T Dragicevich
*Assistant Examiner* — James A Linford
(74) *Attorney, Agent, or Firm* — Richard M. Goldberg

(57) ABSTRACT

Integrated junction system for tubular fluid distribution elements including a tubular element which has, at a first end an enlarged cup shape whose base determines the formation of an annular shoulder inside the tubular element, a ring with a suitably shaped section, which is associated with a second end of the tubular element equipped with a truncated conical or other conveniently shaped protrusion, which abuts on the edge of this second end and with a radial appendix which is associated with the radial end of the tubular element, wherein the system in order to join two tubular elements of the same type, provides that the second end of the tubular element equipped with the ring is inserted into the first end having an enlarged cup shape of the second tubular element until the protrusion of the ring comes into contact with the annular shoulder formed inside the tubular element.

5 Claims, 13 Drawing Sheets

(56) References Cited

U.S. PATENT DOCUMENTS

| | | | |
|---|---|---|---|
| 3,059,941 A | 10/1962 | Kaynor et al. | |
| 4,341,392 A * | 7/1982 | van Dongeren | F16L 9/18 |
| | | | 138/155 |
| 4,583,771 A * | 4/1986 | Wasterberg | F16L 21/035 |
| | | | 138/175 |
| 5,955,162 A * | 9/1999 | Loving | F16L 58/06 |
| | | | 285/31 |
| 2011/0008557 A1 | 1/2011 | Zeyfang | |

FOREIGN PATENT DOCUMENTS

| | | | |
|---|---|---|---|
| DE | 29808155 U1 | 8/1998 | |
| EP | 0543103 A1 * | 5/1993 | |
| GB | 992043 A * | 5/1965 | |
| KR | 102008147 B1 | 10/2019 | |
| WO | 2014071025 A1 | 5/2014 | |
| WO | 2016092153 A1 | 6/2016 | |
| WO | WO-2017129746 A1 * | 8/2017 | E04D 13/0409 |

\* cited by examiner

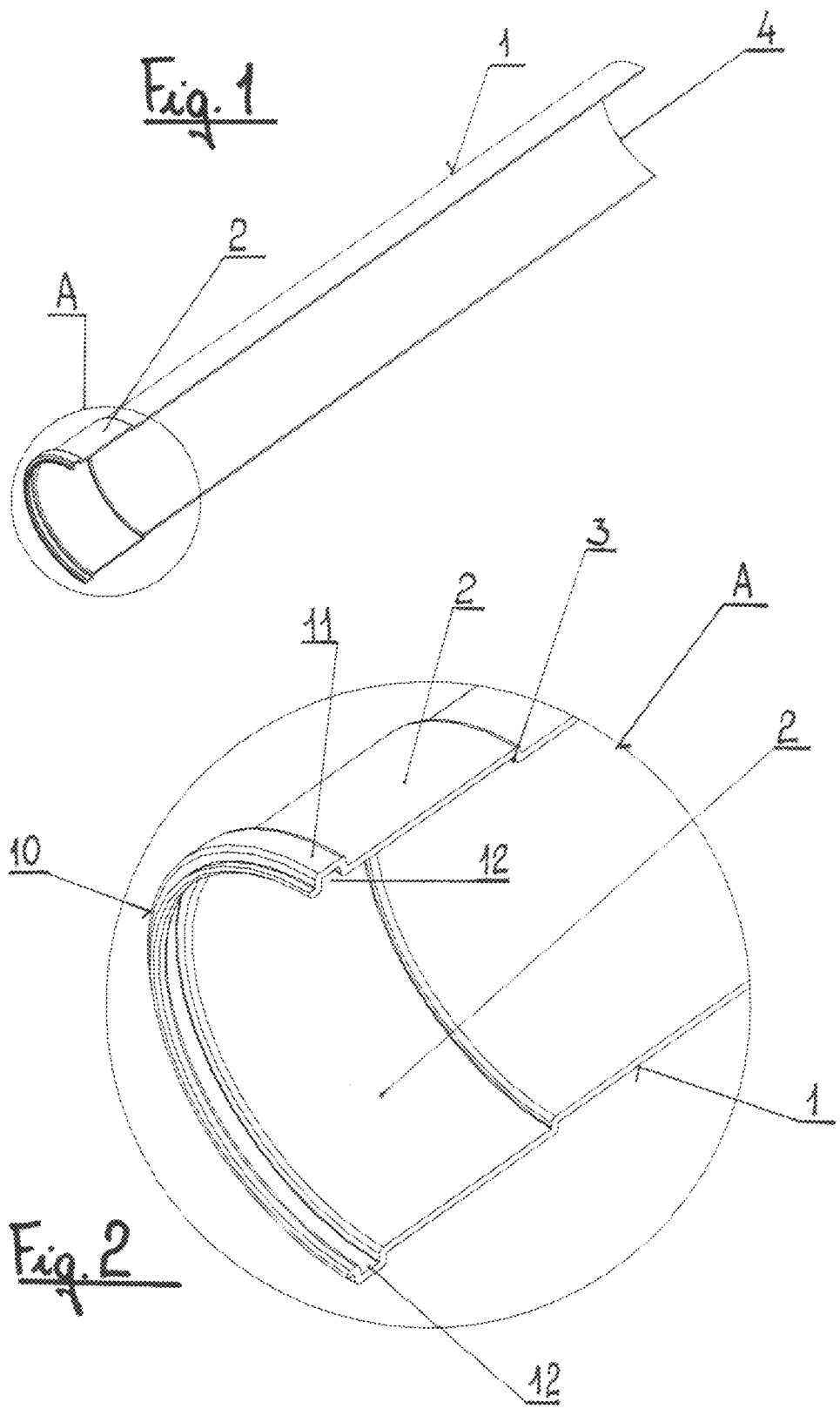

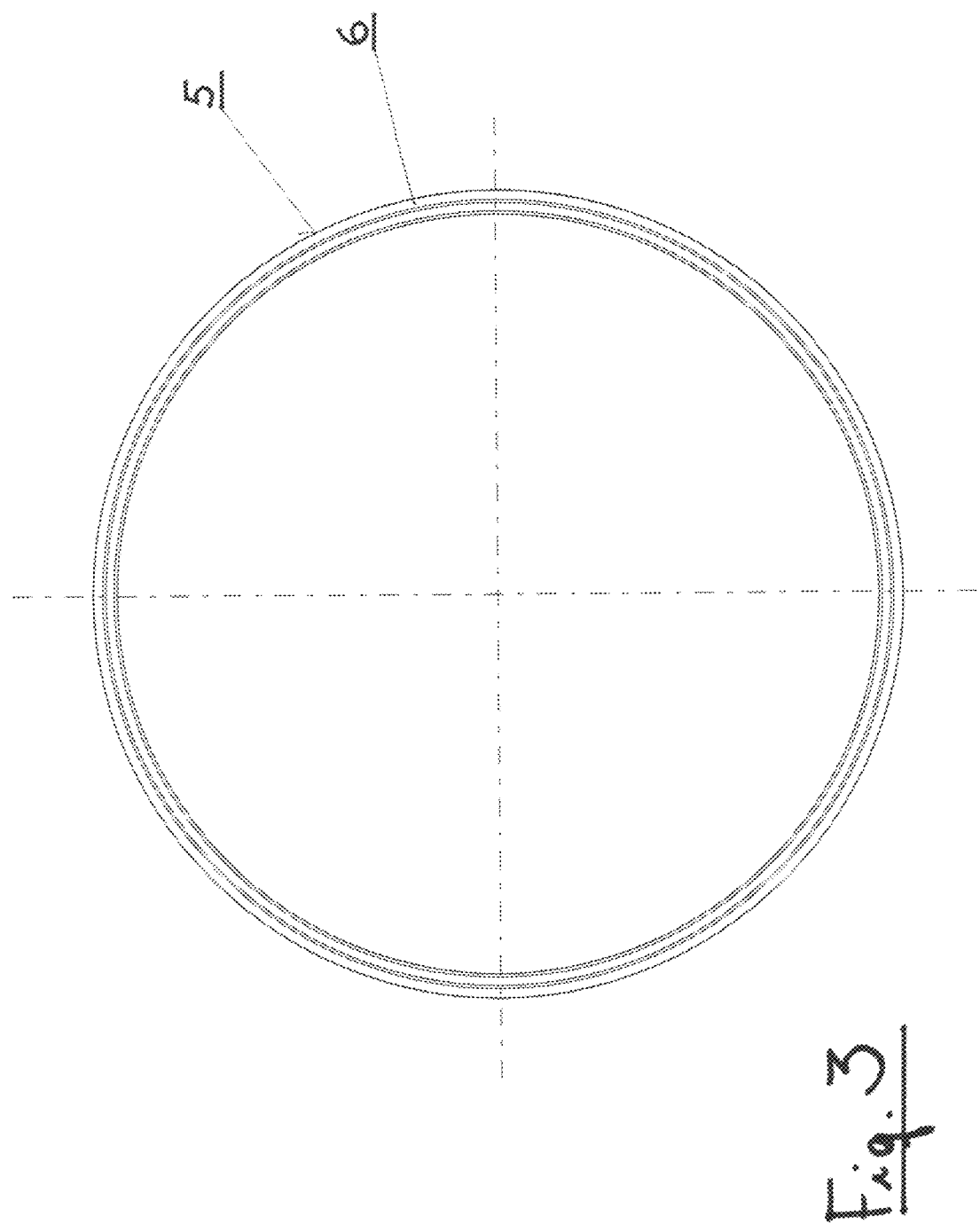

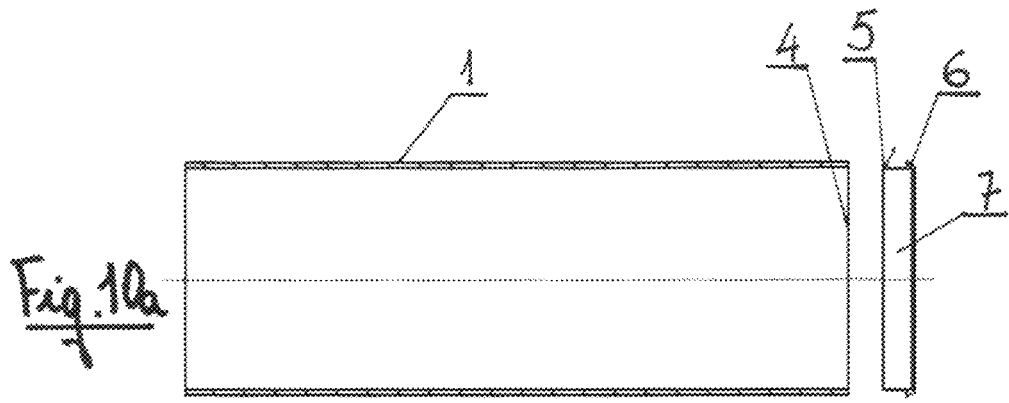
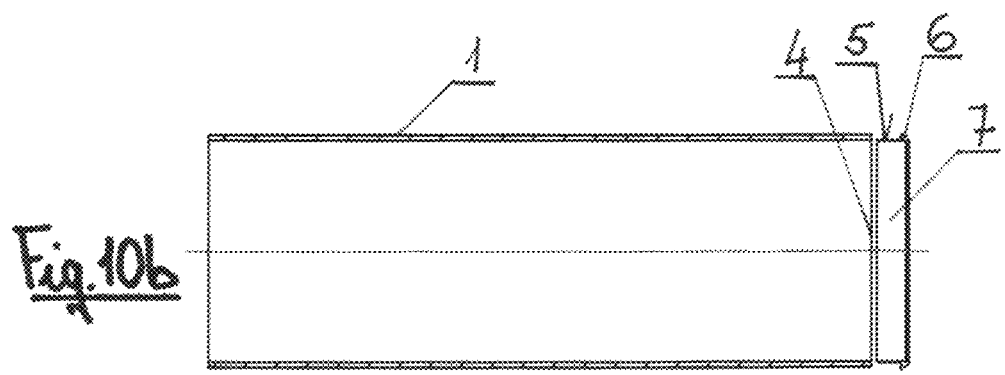
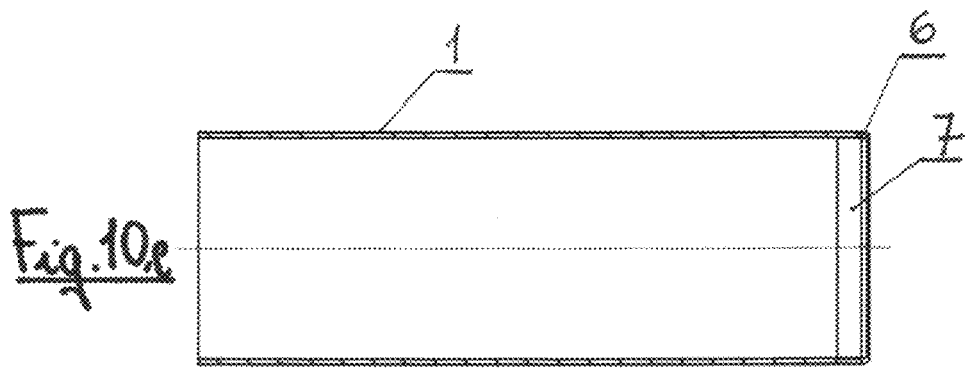

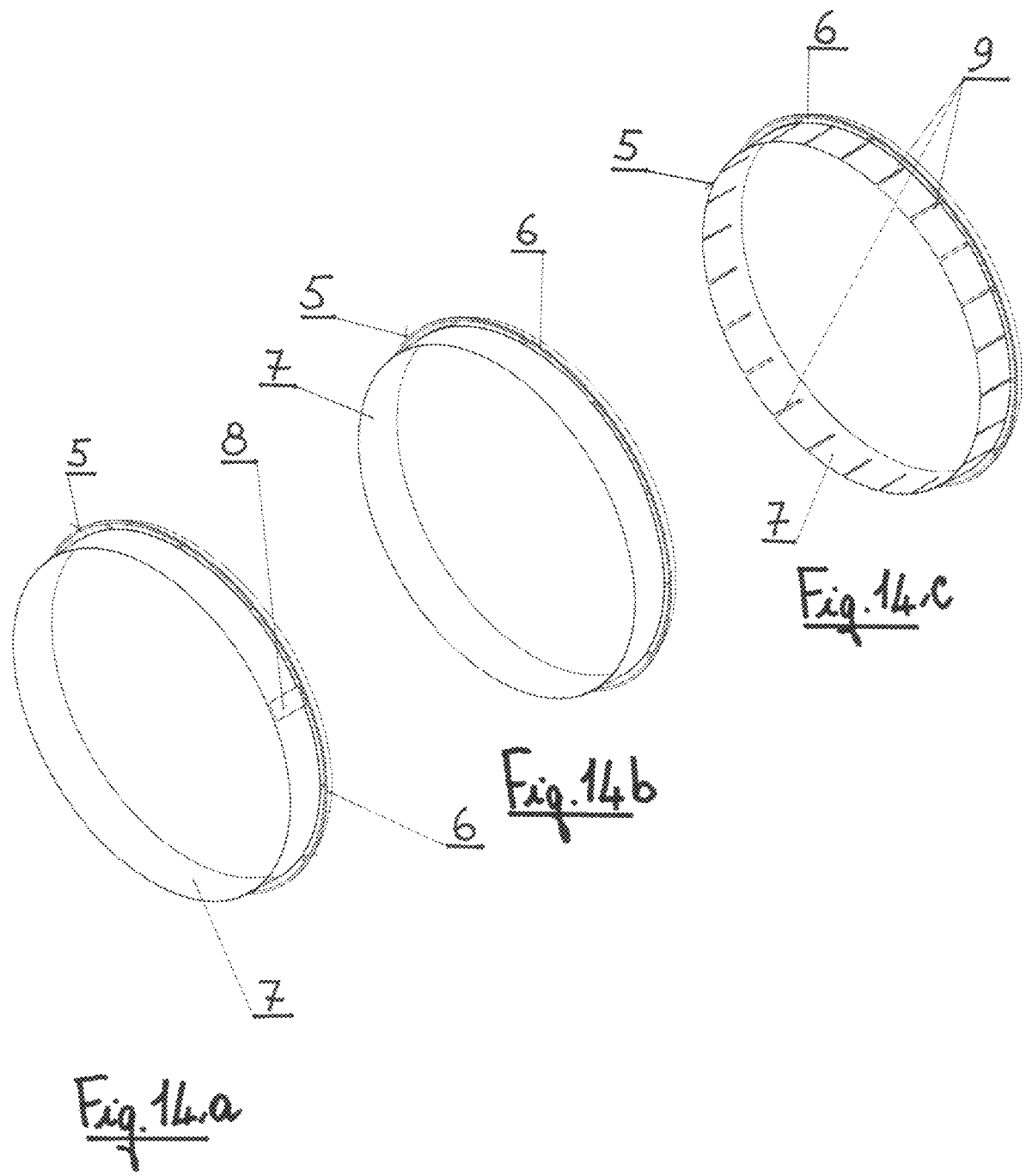

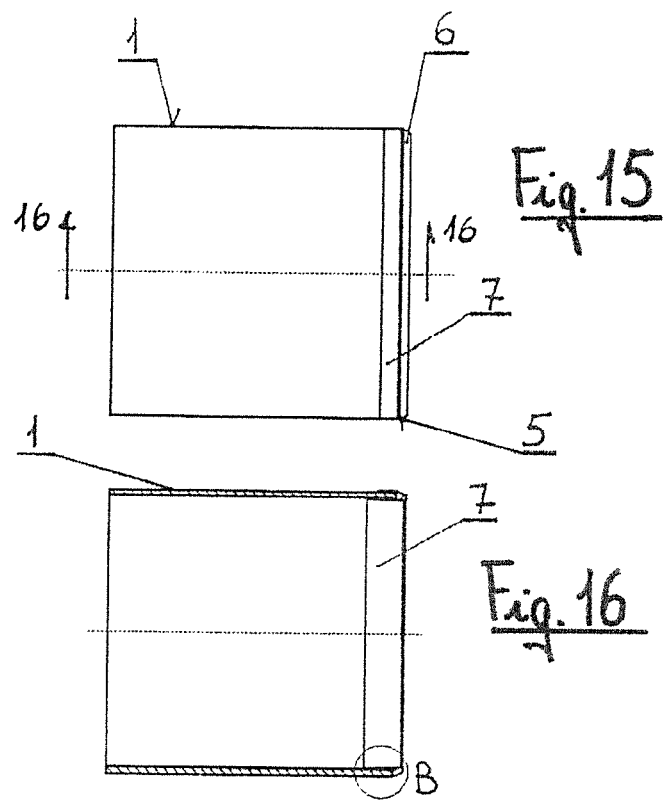
Fig.15
Fig.16
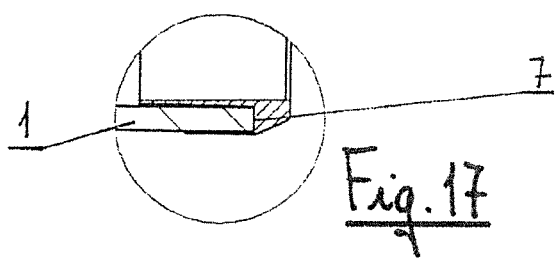
Fig.17
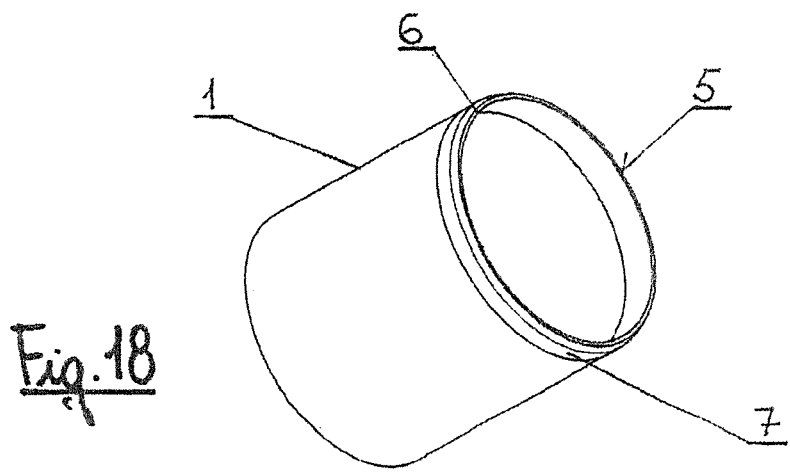
Fig.18

INTEGRATED JUNCTION SYSTEM FOR TUBULAR FLUID DISTRIBUTION ELEMENTS

BACKGROUND OF THE INVENTION

The present invention relates to a junction system of tubular fluid distribution elements. In particular, the present invention relates to a system for joining tubular cup-shaped elements which does not require the use of equipment for processing the pipes.

Various types of junction systems for tubular elements for distributing fluids are known.

A first type is constituted by the union of pipes without cup, by means of a sleeve or other form of fitting (T-shaped, elbow, reduction, etc.) or by means of welding or threading which, however, require a certain processing time for the construction of a network of pipes and do not guarantee a good seal.

According to another system of known type, the joining of pipes with circular section takes place without the use of radial welding and without threading through the use of a watertight cup equipped with an elastomeric sealing gasket. Each single tubular element has, at one end, a cup (female) keying, and at the opposite end a keying with dimensions equal to the external nominal diameter of the tubular (male) element with tolerance such as to allow coupling between the same.

The hydraulic seal against internal pressure (and vacuum) is ensured by means of a toroidal gasket (or other suitable shape) in elastomeric material.

The pipes can then be introduced one inside the other in order to create a continuous piping.

In this solution, the end of the male tubular element, which is inserted into the cup keying of the other pipe to be coupled, has a chamfered edge to facilitate insertion of the pipe into the cup and to easily overcome the elastomeric seal, thus allowing a coupling with interference such as to guarantee the hydraulic seal of the junction within the cup.

The chamfer made at the head of the pipe therefore facilitates, with appropriate lubrication, the overcoming of the gasket until it reaches the bottom of the keying.

The realization of a network of pipes with this system is certainly faster than the known solutions indicated above and guarantees a good seal.

However, the pipe is not always supplied with this process and, if it needs to be cut on site because a smaller pipe than the factory size is required, the chamfered end is in any case lost.

The chamfer, however, in addition to the function of facilitating the assembly of the pipes, also has the function of overcoming the gasket so avoiding possible damage to the same, with consequent impossibility of insertion and/or breakage of the elastomeric gasket with loss of the hydraulic seal.

The pipes with a sharp edge end resulting from the cutting operation in production or for necessity of a shorter length than the state of supply must therefore be chamfered on site or in the workshop through the use of suitable equipment and processes such as turning, chamfering, filing, grinding, etc.

These equipments, with the exception of the manual ones for plastic or small diameter pipes, are often bulky, heavy, rather expensive, do not guarantee precision and above all require several hours of processing as well as being dangerous for the operator.

SUMMARY OF THE INVENTION

The present invention overcomes the aforementioned drawbacks by providing a stable and safe junction system for pipes which can be made in reduced installation times, using assembly equipment and accessories that are not complex, not bulky and normally supplied.

The present invention relates to a junction system for distributing fluids according to the characteristics of the attached claims.

BRIEF DESCRIPTION OF THE DRAWINGS

The invention will be described in detail in an exemplary but not limiting embodiment thereof made with reference to the attached Figures which:

FIG. 1 illustrates a perspective longitudinal section of a tubular element provided with a first cup-shaped end;

FIG. 2 illustrates an enlarged view of detail A of FIG. 1;

FIG. 3 illustrates the top view of the ring according to a first embodiment of the present invention;

FIGS. 10a, 10b and 10c show in central section the steps for assembling the ring on the end of a tubular element according to the present invention;

FIGS. 14a, 14b and 14c illustrate in perspective view three variants of the ring according to the first embodiment of the present invention;

FIG. 15 illustrates the side view of the end part of the tubular element provided with a ring according to a second embodiment of the present invention;

FIG. 16 illustrates the section of the tubular element according to 16-16 of FIG. 15;

FIG. 17 illustrates an enlarged view of detail B of FIG. 16;

FIG. 18 illustrates the perspective view of the tubular element provided with the ring of FIG. 15;

DETAILED DESCRIPTION

Figure 4:
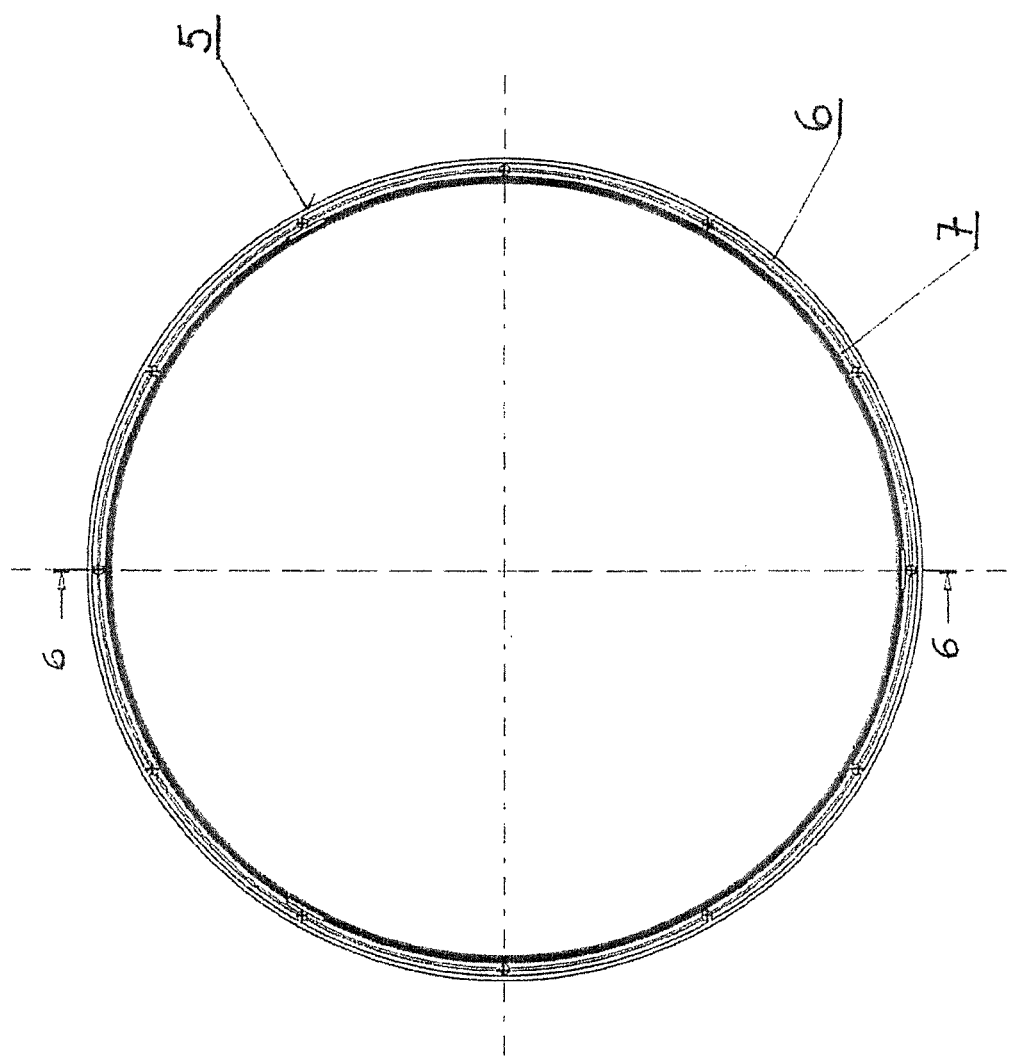
FIG. 4 illustrates the bottom view of the ring of FIG. 3.
Figure 5:
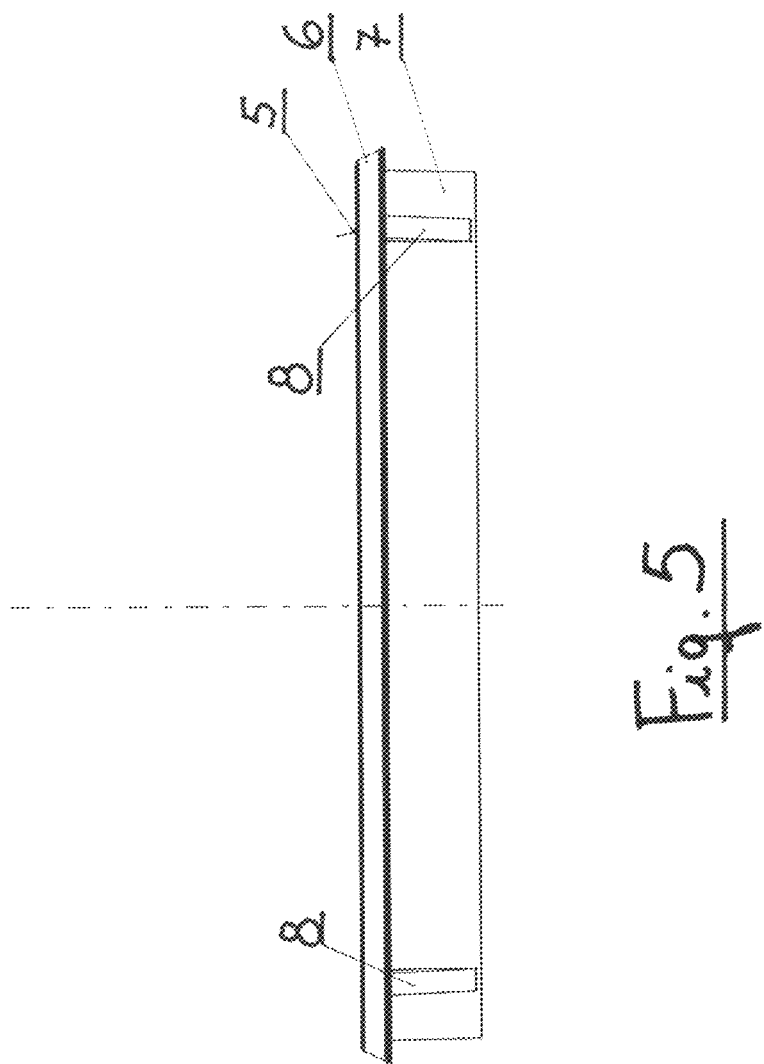
FIG. 5 illustrates the side view of the ring of FIG. 3.
Figure 6:
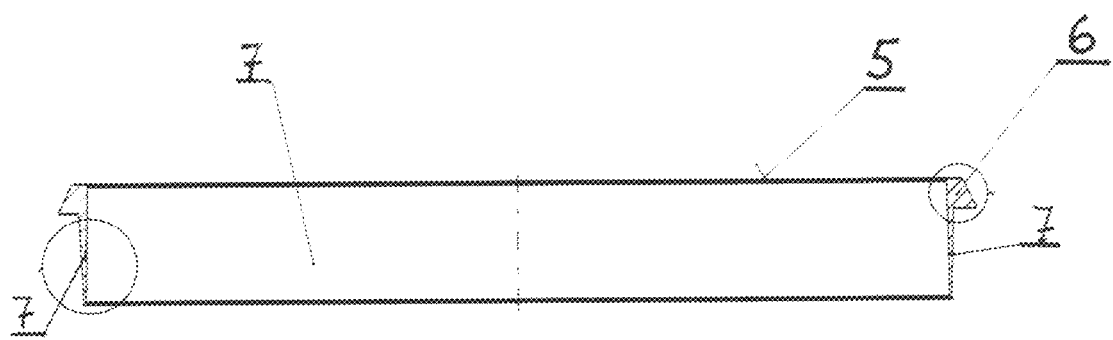
FIG. 6 illustrates a sectional view of the ring according to 6-6 of FIG. 4.
Figure 7:
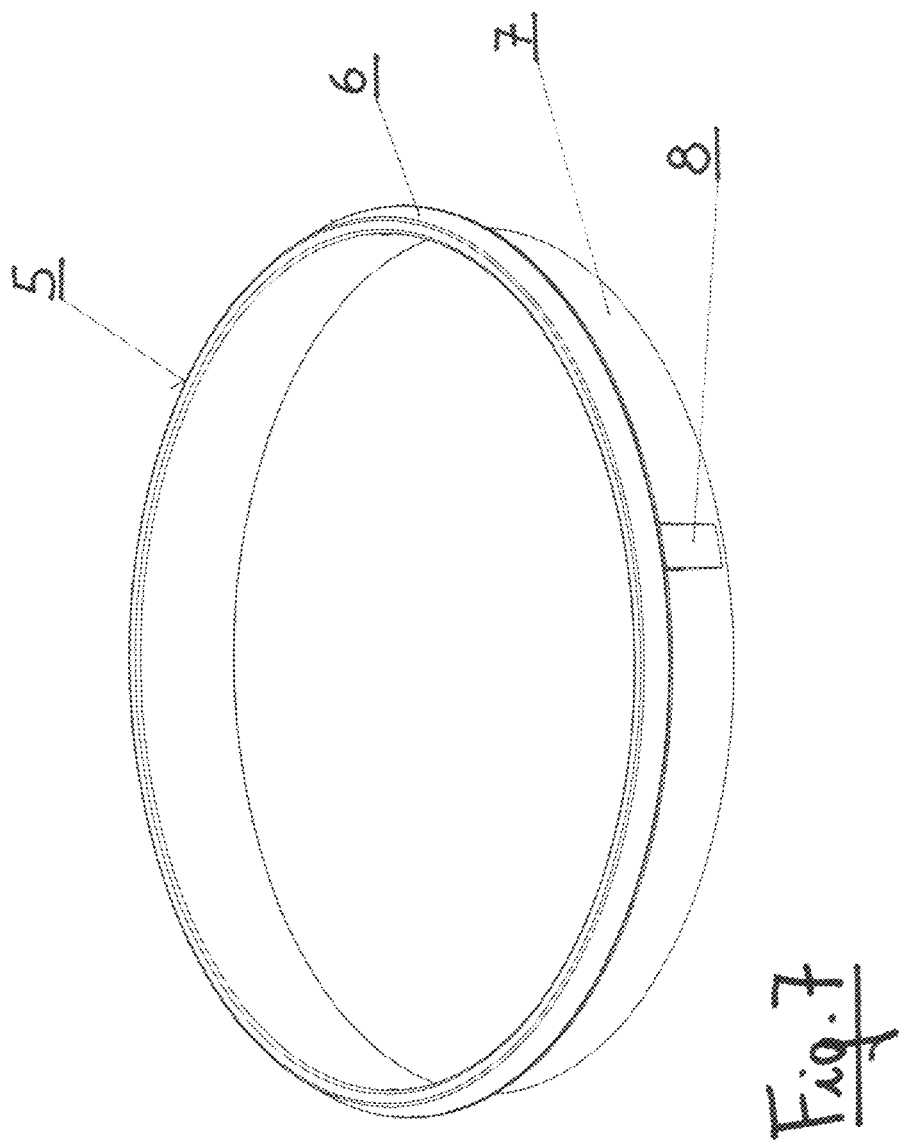
FIG. 7 illustrates a top perspective view of the ring of FIG. 3.
Figure 8:
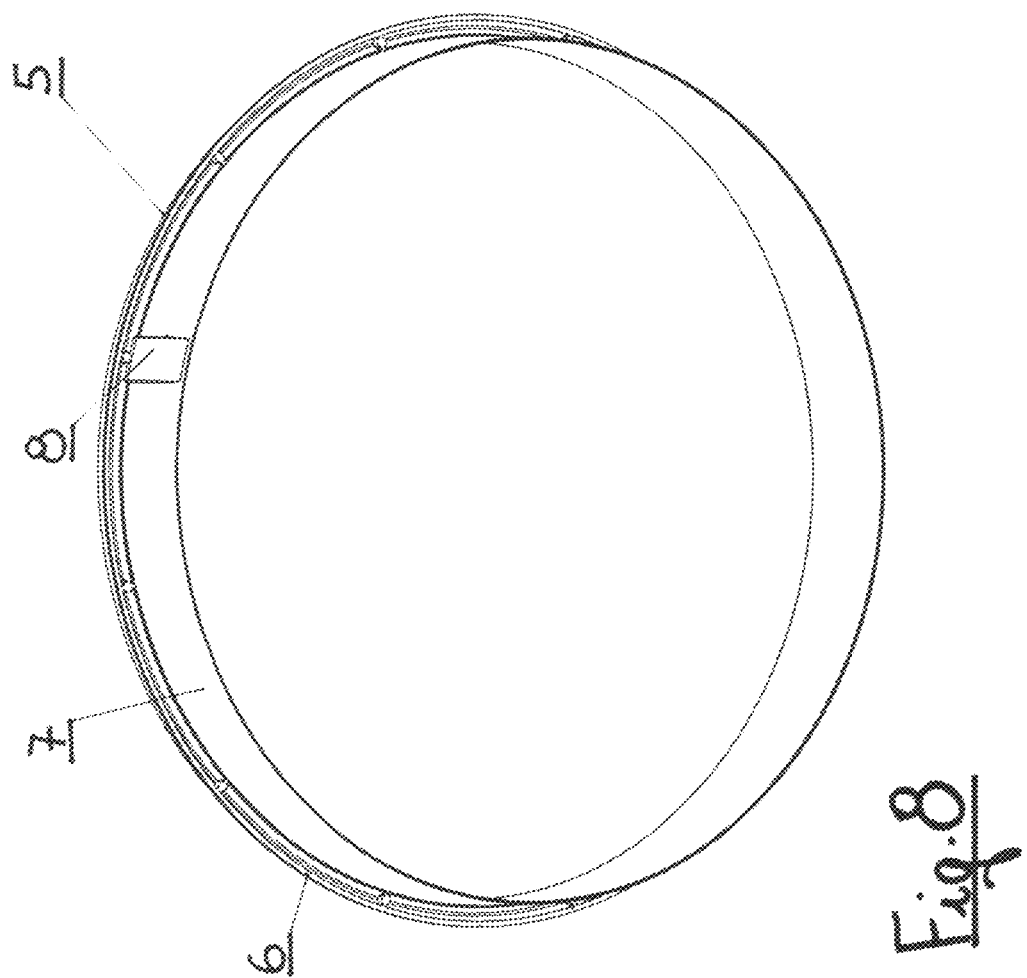
FIG. 8 illustrates a bottom perspective view of the ring of FIG. 3.
Figure 9A:
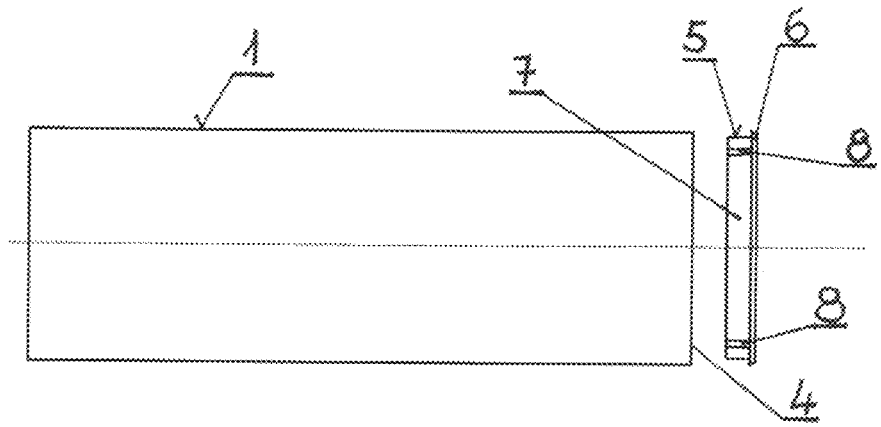
FIGS. 9a, 9b and 9c illustrate a side view of the assembly steps of the ring on the end of a tubular element according to the present invention.
Figure 9B:
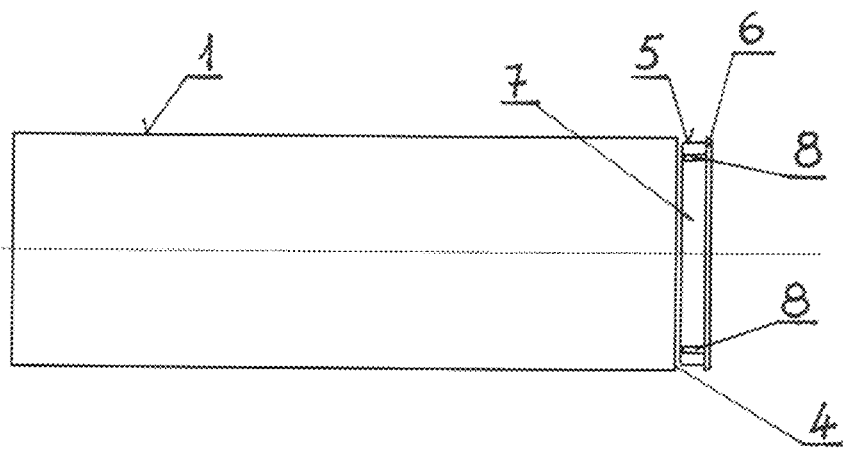
Figure 9C:
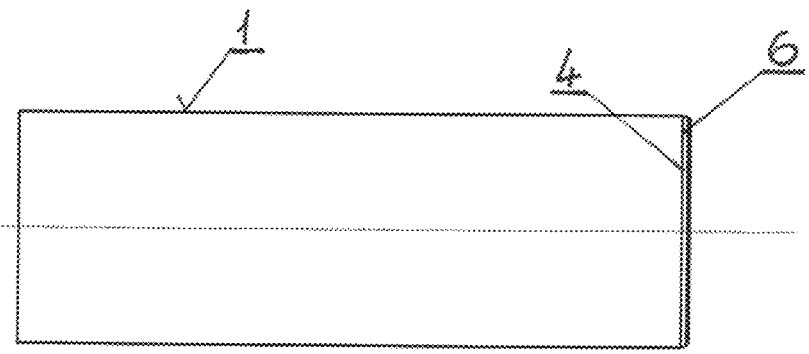
Figure 12:
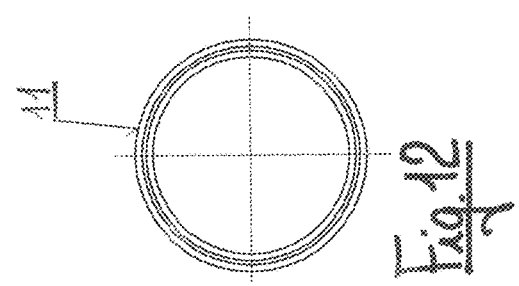
FIG. 12 illustrates the front view of the tubular elements coupled according to the present invention.
Figure 11:
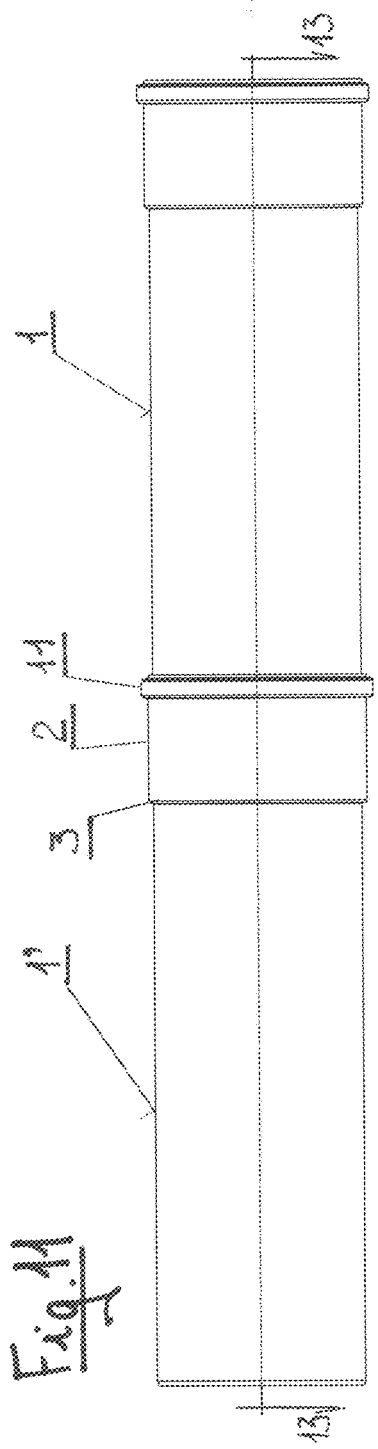
FIG. 11 illustrates the side view of two tubular elements coupled according to the present invention.

With reference to the cited Figures, the junction system for tubular elements according to the present invention comprises a tubular element 1 which has, at one (female)

end 2 an enlarged cup-shape the base of which determines the formation of an annular shoulder 3 inside said tubular element 1.

At the second (male) end 4 of this tubular element the system comprises a ring with a suitably shaped section which is associated with this end, equipped with a truncated conical or other conveniently shaped protrusion 6 which abuts on the edge of the tubular element 1 and with a radial appendix 7 which is associated with the end 4 of the tubular element, for example, by insertion inside the internal diameter or is fitted on the same.

The protrusion 6 therefore realizes a chamfer which is "brought back" to the second end of this tubular element 1. In order to join two tubular elements of the same type, said second (male) end 4 equipped with said ring 5 is inserted into the first (female) end 2 with an enlarged cup shape up to the contact of said protrusion 6 with the annular shoulder 3 formed inside said tubular element 1.

According to a first embodiment (FIGS. 3-8 and FIGS. 14a-c) said radial appendix 7 is conical in shape, able to facilitate its insertion into the male end 4 of the tubular element 1.

In this embodiment, the radial appendix 7 on the external surface has at least one tooth 8, designed to facilitate the insertion of the ring 5 into the tubular element 1, facilitating the compensation of the diametrical tolerances of the tubular element itself.

Said radial appendix 7 of the ring 5 can advantageously also have a series of cuts 9 suitably spaced apart, adapted to further facilitate the insertion of the ring 5 in said tubular element 1 by increasing the elasticity and the compensation of the diametrical tolerances of the tubular element 1.

The external diameter of such ring 5 always has a size slightly greater than the external diameter of the tubular element 1, so as to avoid even a slight protrusion towards the outside of the same.

Figure 13:
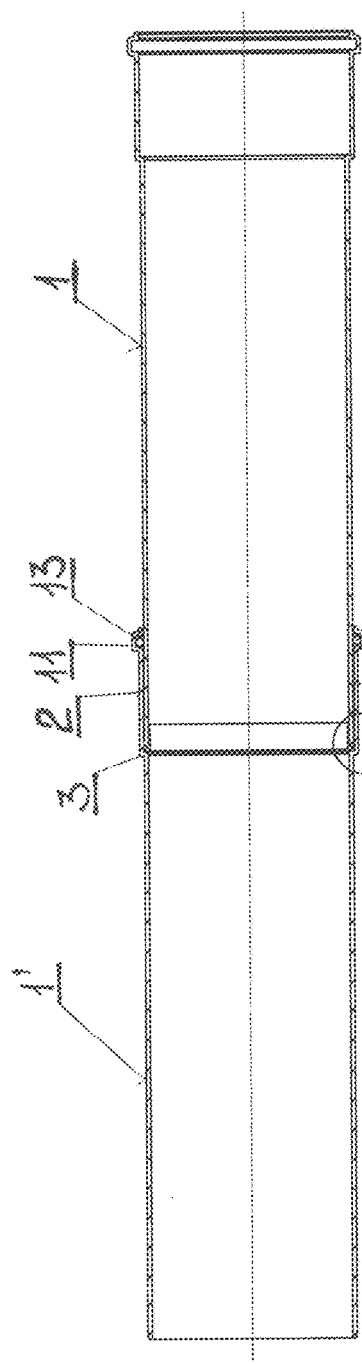
FIG. 13 illustrates the longitudinal section according to 13-13 of FIG. 11.
Figure 13A:
Figure 19:
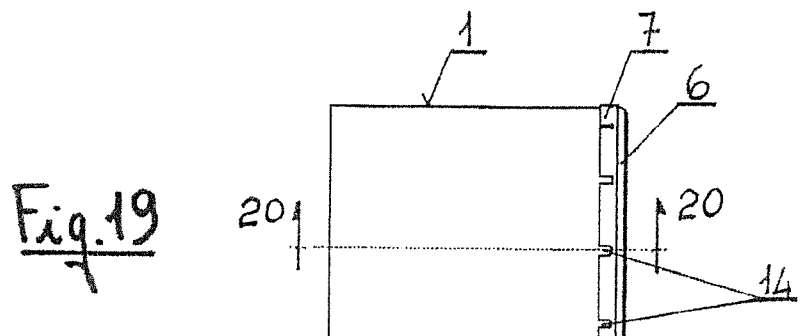
FIG. 19 illustrates the side view of the end part of the tubular element provided with a ring according to a variant of the second embodiment of the present invention.
Figure 20:
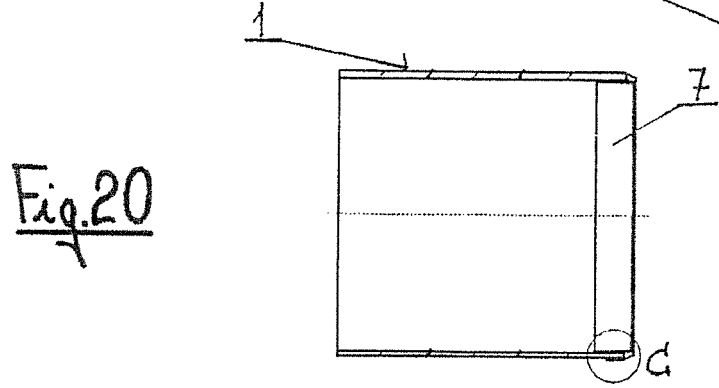
FIG. 20 illustrates the section of the tubular element according to 20-20 of FIG. 19.
Figure 21:
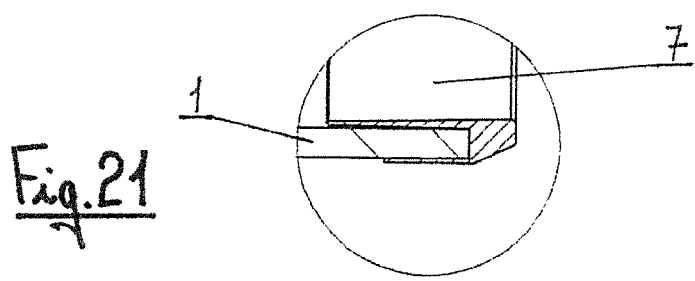
FIG. 21 illustrates an enlarged view of detail C of FIG. 20.
Figure 22:
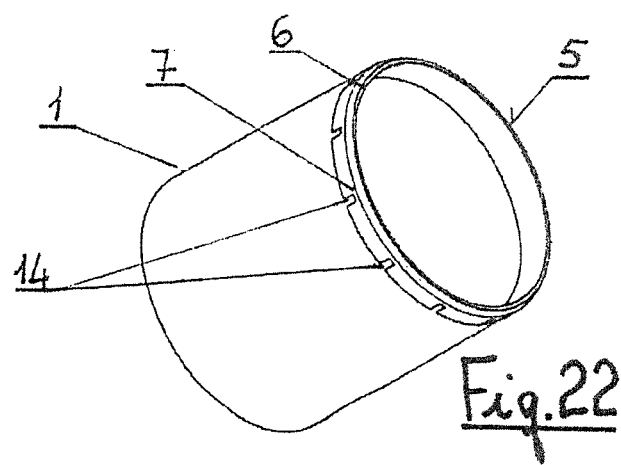
FIG. 22 illustrates the perspective view of the tubular element provided with the ring of FIG. 19.

The first (female) end 2 of enlarged cup-like shape is provided with a specially shaped flange 10, so as to create a concentric edge 11 external to the tubular element and respective cavity 12 facing towards the inside of said tubular element 1, suitable for receiving and retaining inside it an elastomeric gasket 13 of circular seal or of other convenient shape (FIG. 13).

The radial appendix 7, which is to be inserted inside the tubular element 1, has a taper such as to guarantee a forced coupling between the two elements so as to make it impossible to detach said ring 5 during insertion of the tubular element 1 in the cup of the second tubular element 1'.

In a second embodiment of the present invention (FIGS. 15-22), the ring 5 has a radial appendix 7 slightly larger than the male end 4 of the tubular element 1 and is shaped like a "C" so as to fit on the male end and receive it inside while remaining bound to it.

In this embodiment advantageously the aforementioned radial appendix 7 shaped like a "C" has a series of cuts 14 suitable for facilitating the insertion of said male end 4 of the tubular element 1 and remaining bound to it.

The invention therefore allows the easy creation of a network of pipes avoiding the mechanical operations necessary for the execution of chamfers on the heads of the pipes which do not have them.

Moreover, the possibility of injury following the cutting operations is eliminated for the operators assigned to handle the pipeline during the assembly phases of the network.

Machining costs are significantly reduced and the time required for fitting the insertion ring is just a few seconds.

The insertion of the male part 4 of the tubular element 1 into the cup 2 of the tubular element 1' with the overcoming of the elastomeric seal 13 is considerably facilitated, with the elimination of the production of scraps (chips) of the material of which the pipes are made, thus avoiding, in addition to operator injuries, the possibility of damaging the seal during the introduction phase.

The assembly of the tubular elements, according to the present invention, therefore takes place as follows: once the operator has cut the tubular element 1 in the male end 4, inserts the ring 5 on the end 4 by applying the force necessary for the lower edge of the protrusion 6 to abut with the edge of said male end 4. Once said operation has been carried out, it is sufficient to insert said male end 4 equipped with a ring 5 of a tubular element 1 inside the cup-shaped end 2 of another tubular element 1' up to the end of its axial stroke, and therefore up to contact with the base or shoulder 3 of the cup-shaped end 2, after the edge of the ring 5 has passed the elastomeric seal 13 and is received in cavity 12.

The embodiments described in the present description and the configurations shown in the drawings are only the preferred embodiments of the present invention but the technical variants falling within the above expressed concept of the present invention are also to be considered protected by the present application.

The invention claimed is:

1. Integrated junction system for tubular fluid distribution elements, comprising:
    a first tubular element which has, at a first end an enlarged cup shape with a base which determines the formation of an annular shoulder inside said first tubular element, the first tubular element having an external diameter,
    a ring with a shaped section, which is associated with a second end of said first tubular element, equipped with a shaped protrusion, which abuts on an edge of this second end and with a radial appendix which is associated with the second end of the first tubular element,
    wherein said system, in order to join two said tubular elements of the same structural configuration, provides that said second end of the first tubular element equipped with said ring is inserted into the first end of a second said tubular element having said enlarged cup shape until the protrusion of the ring of the first tubular element comes into contact with the annular shoulder formed inside the second said tubular element,
    wherein said radial appendix is conical in shape, able to facilitate insertion thereof into the second end of the first tubular element,
    the conical protrusion of the ring has an external diameter which always has a size greater than the external diameter of the first tubular element, so as provide a sealing fit with an inner surface of the enlarged cup shape of the first end and
    wherein the ring is configured to not extend around the outer surface of the first tubular element.

2. The system according to claim 1, wherein the radial appendix, on an external surface thereof, has at least one tooth, configured to facilitate insertion of the ring into the first tubular element, the tooth being arranged between the radial appendix and an internal surface of the first tubular element when the ring is inserted into the first tubular element.

3. The system according to claim 1, wherein said radial appendix of the ring includes a series of spaced apart cuts, adapted to facilitate insertion of the ring into said first tubular element, thereby increasing the elasticity and compensation of diametrical tolerances of the first tubular element.

4. The system according to claim 1, wherein the enlarged cup-shaped end is provided with a shaped flange, so as to create a concentric edge external to the first tubular element and a respective cavity facing towards an inside of said first tubular element, able to receive and retain inside the cavity an elastomeric gasket seal.

5. The system according to claim 1, wherein the protrusion is a truncated conical protrusion.

* * * * *